Jan. 31, 1933.    J. A. REASONER    1,896,013
BRAKE SHOE
Filed Dec. 17, 1931
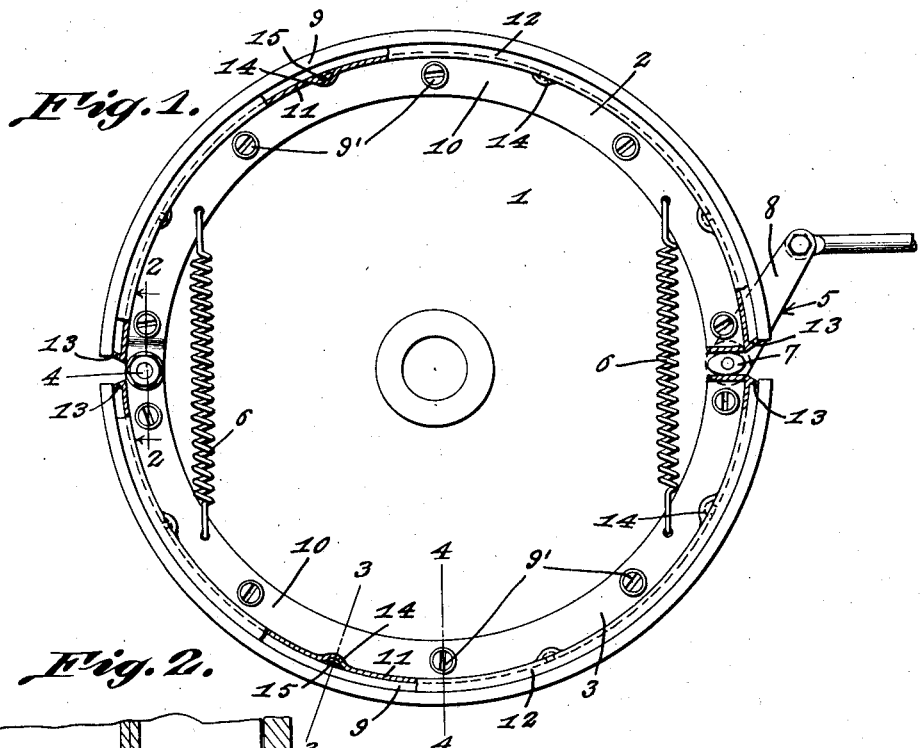
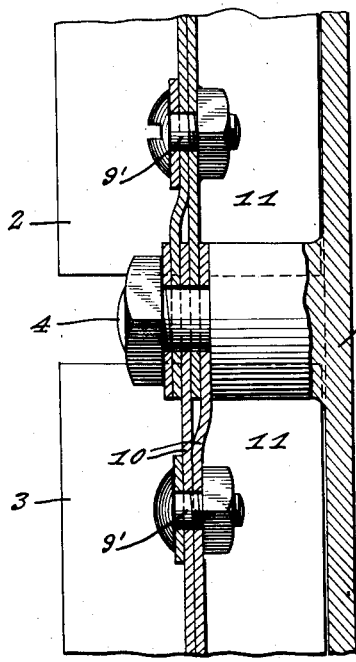
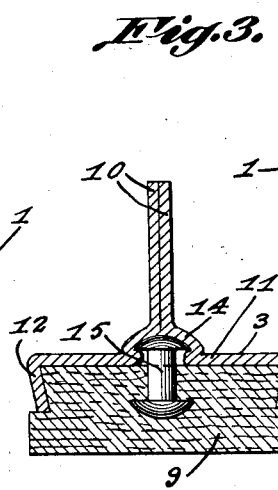
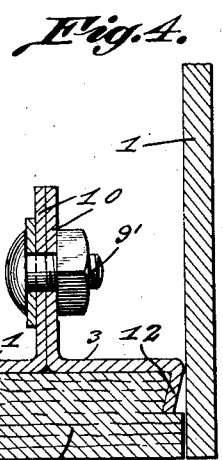
James A. Reasoner, INVENTOR
BY *Victor J. Evans & Co.*
ATTORNEY Patented Jan. 31, 1933

1,896,013

UNITED STATES PATENT OFFICE

JAMES A. REASONER, OF LANCASTER, OHIO

BRAKE SHOE

Application filed December 17, 1931. Serial No. 581,728.

This invention relates to brakes of the character employing shoes and linings therefor and has for the primary object, the provision of an improved means for removably securing a lining to a shoe, whereby the lining may be either applied or removed from the shoe with the least amount of effort and within the shortest period of time so as to reduce the cost of relining brakes to a minimum.

Another object of this invention is the provision of a sectional shoe wherein the sections are detachably connected and so constructed that a lining may be easily and quickly applied or removed therefrom and when applied any possibility of accidental disconnection of the lining from the shoe is entirely obviated and further eliminates the employment of rivets or similar fasteners and the drilling of the lining to receive the fasteners and which reduces installation cost to a minimum and obviates the cutting or wearing of brake drums by rivets and the squeaking of brakes when applied due to rivets engaging the drums.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation partly in section illustrating a brake constructed in accordance with my invention.

Figure 2 is a fragmentary sectional view taken on the line 2—2 of Figure 1.

Figure 3 is a transverse sectional view taken on the line 3—3 of Figure 1.

Figure 4 is a similar view taken on the line 4—4 of Figure 1.

Referring in detail to the drawing, the numeral 1 indicates a brake mounting having associated therewith upper and lower arcuate shaped brake shoes 2 and 3. The shoes 2 and 3 are hinged to the mounting 1 as shown at 4 with the free ends of the shoes contacting with an operating medium 5. Coiled springs 6 connect the shoes 2 and 3 and urge the free ends of the shoes in engagement with the operating medium and the latter consists of a cam shaped element 7 journalled to the mounting 1 and oscillated by an arm 8 to cause the shoes to move into and out of engagement with the brake drum. The mounting 1 and the means of securing the shoes thereto and the operating medium for the shoes are of conventional construction and my invention resides in the construction of the shoes and the means of securing linings 9 thereto.

Each shoe includes detachable sections secured together by bolts or like fasteners 9'. Each section of the shoe includes an arcuate shaped portion 10 apertured to receive the fasteners and is formed integrally with a rim portion 11 having formed on one side edge a flange 12 and at each end has a flange 13. The sections of the shoe when assembled form a channel to receive the lining 9, the flanges 12 and 13 being disposed at an inclination relative to the rim portions 11 and the side edges and ends of the lining 9 are bevelled or chamfered so that when the lining 9 is mounted within the channel separation thereof from the shoe will be prevented and thereby obviate the customary practice of riveting linings to shoes.

At spaced intervals the arcuate shaped portions 10 adjacent the rim portions 11 are offset or recessed to form pockets 14 when the sections are assembled and the pockets receive headed studs 15 embedded within the lining 9 to prevent creeping of the lining 9 circumferentially of the shoe. It is to be understood that during the manufacture of the lining 9, the ends and edges thereof are bevelled or chamfered so as to fit snugly within the rim of the shoe when the lining is applied thereto.

To apply a lining to a shoe, the sections of the latter are slightly separated by releasing the fasteners 9' so that the lining may be easily positioned in the channel of the rim and the fasteners are then tightened causing the flanges 12 and 13 to tightly grip the lining thereby preventing the separation of the lining from the shoe. It is understood that the lining may be manufactured with or without the headed studs 15 and when employing the studs, they are received within the pockets 14 cooperating with the flanges 13 for preventing creeping of the lining relative to the channel of the shoe. A lining secured to a shoe in accordance with the foregoing obviates the employment of rivets or silimar fasteners now in use and permits the lining to be applied to the shoe in a shorter period of time and with less effort on the part of the operator and as the rivets are eliminated, the drilling of the lining is also eliminated and the elimination of the rivets further prevents squeaking of brakes when applied as now customary in brake constructions due to the rivets coming in contact with the brake drums.

While I have shown and described the preferred embodiment of my invention, it will be understood that minor changes in construction, combination and arrangement of parts may be made without departing from the spirit and scope of my invention, as claimed.

Having thus described my invention, what I claim is:

1. A brake shoe comprising a body including companion sections, fasteners detachably connecting the sections, rim portions formed on said sections, side and end flanges formed on the rim portions and cooperating with each other and said rim portions in providing a channeled lining seat, and a lining positioned in said seat and having bevelled side and end edges overlied by the flanges to removably secure the lining to the body.

2. A brake shoe comprising a body including companion sections, fasteners detachably connecting the sections, rim portions formed on said sections, side and end flanges formed on the rim portions and cooperating with each other and said rim portions in providing a channeled lining seat, a lining positioned in said seat and having bevelled edges overlied by the flanges to removably secure the lining to the body, and anchoring means carried by the lining and received by the body to cooperate with the flanges in preventing the lining creeping relative to the body.

3. A brake shoe comprising a body including companion sections, fasteners detachably connecting the sections, rim portions formed on said sections, side and end flanges formed on the rim portions and cooperating with each other and said rim portions in providing a channeled lining seat, a lining positioned in said seat and having bevelled edges overlied by the flanges to removably secure the lining to the body, pockets formed in said body, and headed studs embedded in the lining and received in the pockets for cooperating with the flanges in preventing creeping of the lining relative to the body.

In testimony whereof I affix my signature.

JAMES A. REASONER.